Figure 1:
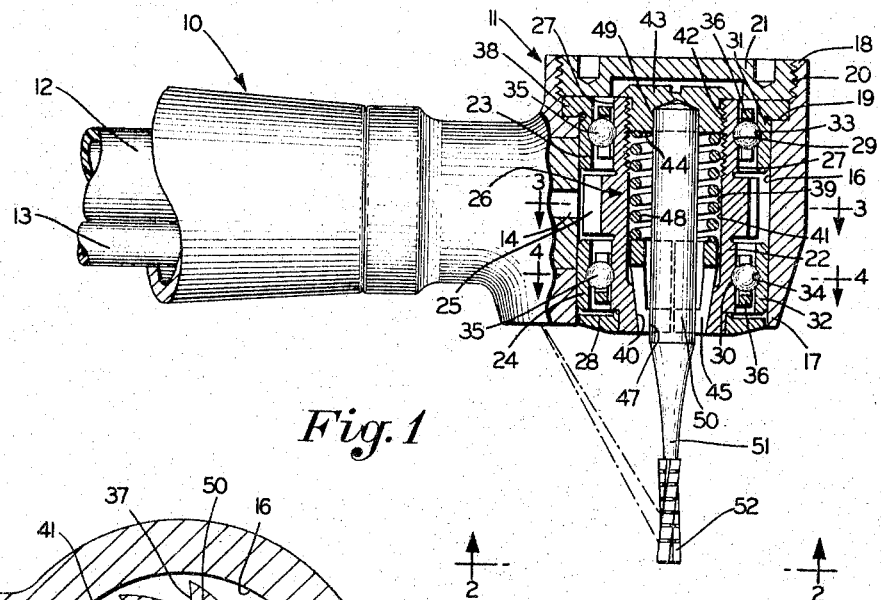

April 18, 1967  J. A. MAURER  3,314,153

DENTAL HANDPIECE CONSTRUCTION

Filed June 7, 1963  2 Sheets-Sheet 1

INVENTOR.
John A. Maurer
BY
Frease, Bishop, Johns & Schick
ATTORNEYS

April 18, 1967  J. A. MAURER  3,314,153
DENTAL HANDPIECE CONSTRUCTION
Filed June 7, 1963  2 Sheets-Sheet 2

INVENTOR.
John A. Maurer
BY
Frease, Bishop, Johns & Schick
ATTORNEYS

United States Patent Office 3,314,153
Patented Apr. 18, 1967

3,314,153
DENTAL HANDPIECE CONSTRUCTION
John A. Maurer, Canton, Ohio, assignor to The Weber Dental Manufacturing Company, Canton, Ohio, a corporation of Ohio
Filed June 7, 1963, Ser. No. 286,244
3 Claims. (Cl. 32—27)

My invention relates to improvements in dental handpieces, and more specifically to a unique form of head for dental handpieces which is of maximum compactness and is provided with a new construction of burr chuck. Even more specifically, my invention relates to a dental handpiece burr chuck specifically formed for securely gripping a dental burr to rotate the same, and yet, by use of a simple tool, is conveniently releasable for the removal and replacement of the burr.

Many prior forms of burr chucks have been provided for dental handpieces, all of which have required some form of releasable means so that the dental burrs may be selectively positioned in and removed from the particular chuck. Furthermore, it has been a problem in the formation of all of these prior chuck constructions to maintain the head enclosing these chucks of minimum size, while still providing a chuck which properly grips the dental burr in order to rotate the same. Still further, the chuck must be properly selectively releasable in order that the dental burr may be quickly and easily removed therefrom and replaced therein when such is required.

Certain recent forms of chuck constructions for dental handpieces have included the use of various types of spring collets, or resilient members formed of rubber or light plastic materials, all of which are constructed sufficiently resilient for inserting the burr into the chuck, yet of sufficient gripping force on the burr shank so that rotational force may be imparted through the chuck to the burr for proper rotation of the same. Various difficulties have been encountered with this form of chuck in that it is difficult to provide the chuck with sufficient resiliency that the burr may be conveniently installed therein and removed therefrom, while still providing the necessary gripping force to obtain proper rotation of the burr by the chuck during use.

For instance, in the case of contra-angle handpieces where the burr projects from the bottom or forward end of a driving head portion and the top or rearward end of the head portion is likewise exposed, these collet form of chucks have been used and openings provided through the top of the head into the chuck in order to reversely force out the dental burr from the chuck by use of an additional tool, in order to remove the dental burr from the chuck while still maintaining the chuck with sufficient gripping force to properly rotate the burr when the burr is installed therein. Not only does this form of removal require a considerable force, but the tight gripping of the burr shank in this manner results in the necessary repeated insertion and removal causing excessive wear on the collet as well as the burr shanks, thereby resulting in the necessity of frequent replacements.

It is, therefore, a general object of the present invention to provide a chuck construction for a dental handpiece having a specifically formed head of minimum size in which the dental burr may be easily and conveniently selectively installed therein and removed therefrom by use of a simple tool, yet when installed therein, the burr is securely retained by the chuck construction for imparting the necessary rotational force thereto.

It is primary object of the present invention to provide a chuck construction for dental handpieces having heads of minimum size in which excessive forces are not required for installing burrs therein and removing burrs therefrom.

It is a further object of the present invention to provide a chuck construction for dental handpieces which does not require reverse access to the chuck for removal of the burrs therefrom and, therefore, can be conveniently adapted to any form of dental handpiece, whether contra-angle or otherwise.

It is still a further object of the present invention to provide a chuck construction for dental handpieces which may be completely released prior to insertion of the shank of a dental burr therein or removal therefrom, thereby resulting in a minimum incidence of wear and a maximum of operational life without replacement.

It is an additional object of the present invention to provide a chuck construction for dental handpieces in combination with a tool specifically adapted for selectively releasing the chuck when it is desired to install burrs therein or remove the same therefrom.

Finally it is an object of the present invention to provide a chuck construction for dental handpieces and a tool for selectively releasing the same which satisfy all of the foregoing objects in a simple and efficient maner and may be provided at a minimum of manufacturing cost.

These and other objects are accomplished by the parts, constructions, arrangements, combinations and subcombinations comprising the present invention, a preferred embodiment of which—illustrative of the best mode in which applicant has contemplated applying the principles—is set forth in the following description and illustrated in the accompanying drawings, and which is particularly and distinctly pointed out and set forth in the appended claims forming a part hereof.

In general terms, the dental handpiece construction comprising the present invention may be stated as including a handle having a head at an outer end of the handle, with a driving shaft having a collet-type burr chuck rotatably mounted in the head by unique bearing means of such forms so as to provide maximum compactness of the head and therefore minimum size. Furthermore, the invention may include a unique form of collet-type chuck within the head specifically formed for tightly and securely gripping a dental burr for rotation of the same, yet conveniently virtually totally releasable for removal and replacement of the burr. Also, the invention may include a tool specifically adapted for releasing the unique burr chuck when removal and replacement of the dental burr is desired.

More specifically, the shaft rotatably mounted in the head, which also may form a part of the burr chuck, is preferably formed with a cylindrical outer circumferential surface having axially spaced ball grooves formed directly in and extending continuously circumferentially around this outer surface. Further, outer ball bearing races are positioned telescoped over the shaft radially outwardly of these ball grooves with these outer races having internal ball grooves radially outwardly aligned with the shaft ball grooves. Still further, a series of balls are positioned between the outer races and shaft outer surface received in the respective ball grooves, with means securing the outer races in the head housing and means for rotating the shaft.

The shaft, when forming part of the burr chuck, may include an axially extending opening having a rearward end and a forward end opening outwardly of an end of the housing, with the shaft or chuck opening being provided with a radially inwardly tapered wall portion tapering inwardly in the axial direction from the opening rearward end toward the forward end. Further, a hollow generally cylindrical collet is axially slidably received in the chuck opening with this collet having resilient gripping fingers extending in an axial direction toward the opening forward end received in the opening tapered wall portion and bearing resiliently against this wall portion.

Still further, resilient means, preferably in the form of a compression spring, is mounted within the chuck opening operably connected to the collet axially rearward of the collet gripping fingers for normally resiliently urging the collet gripping fingers axially forwardly along said opening tapered wall portion to resiliently grip a dental burr, and being compressible for inward axial movement of said collet gripping fingers along said opening tapered wall portion to release the burr.

Finally, the burr chuck releasing tool, specifically adapted for the particular type of burr chuck, may include a frame formed for receiving the head of the dental handpiece, with a collar mounted on the frame having axially extending flange means extending inwardly of the frame and positioned engageable with the burr chuck collet gripping fingers. Further, this tool has means operable, preferably in the form of a reciprocal plunger, for causing relative axial movement between the dental handpiece head and tool collar for forcing the collar axially against the collet gripping fingers to force the collet inwardly of the head along the chuck tapered wall portion and release the collet gripping fingers from gripping the dental burr.

Figure 3:
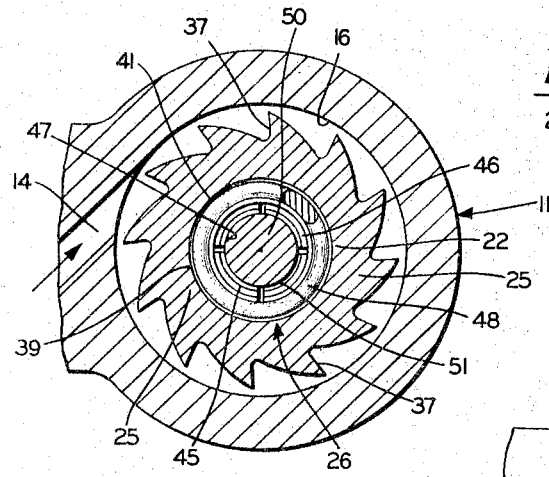
Figure 2:
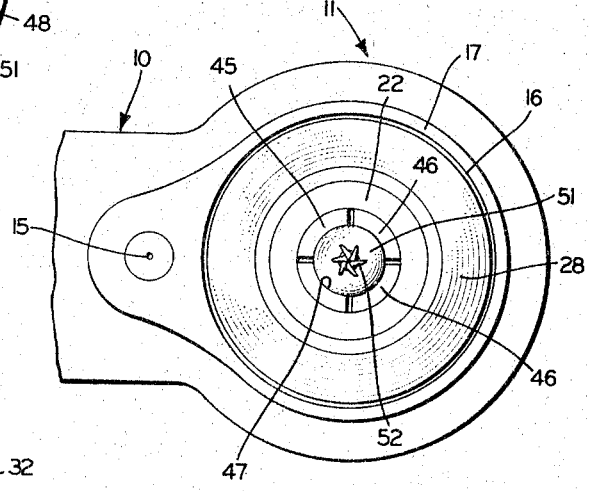
Figure 4:
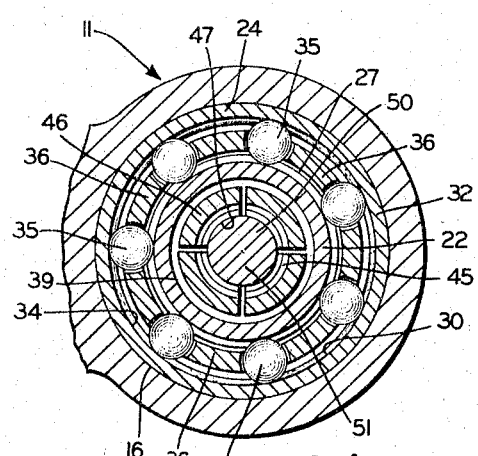
Figure 5:
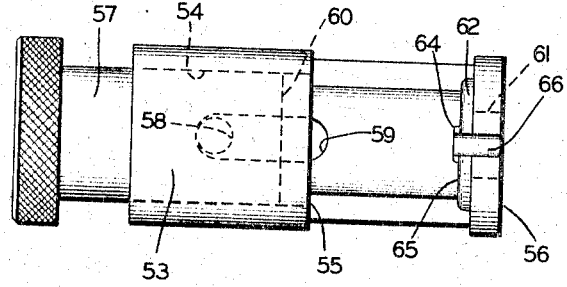
Figure 6:
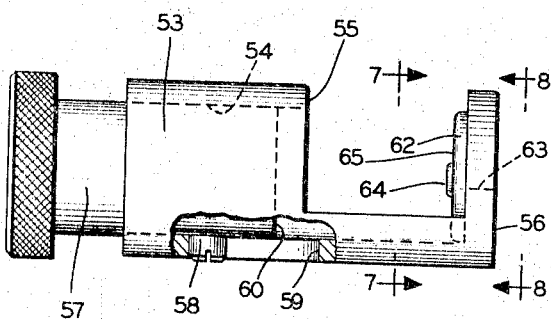
Figure 7:
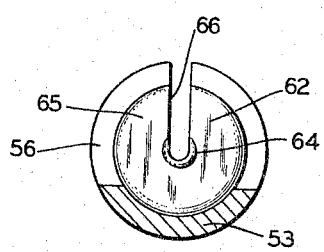
Figure 8:
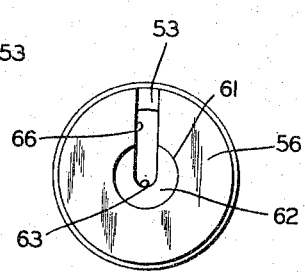
Figure 10:
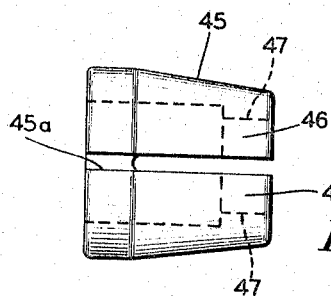
Figure 9:
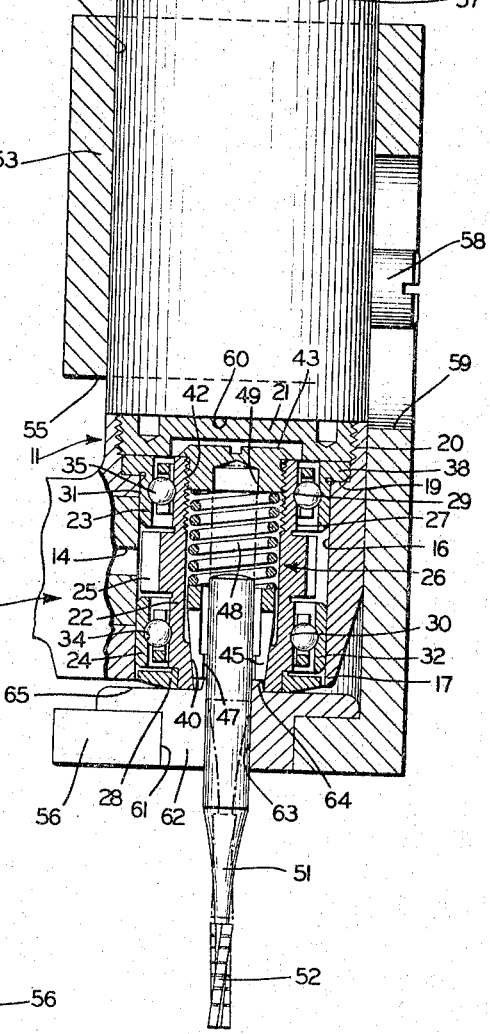

By way of example, an embodiment of the dental handpiece construction and the burr chuck releasing tool of the present invention is illustrated in the accompanying drawings forming a part hereof, wherein like numerals indicate similar parts throughout the several views, and in which:

FIG. 1 is a fragmentary side elevation showing parts broken away and in vertical section of the dental handpiece construction illustrating the present invention;

FIG. 2, an enlarged fragmentary bottom plan view of the handpiece construction of FIG. 1 looking in the direction of the arrows 2—2 in FIG. 1;

FIG. 3, a fragmentary enlarged sectional view, part in elevation, looking in the direction of the arrows 3—3 in FIG. 1;

FIG. 4, a fragmentary enlarged sectional view, part in elevation, looking in the direction of the arrows 4—4 in FIG. 1;

FIG. 5, a front elevation of the burr chuck releasing tool illustrating the present invention;

FIG. 6, a side elevation of the tool of FIG. 5 with parts broken away and parts in section;

FIG. 7, a sectional view, part in elevation, looking in the direction of the arrows 7—7 in FIG. 6;

FIG. 8, a bottom plan view of the tool of FIGS. 5 and 6 looking in the direction of the arrows 8—8 in FIG. 6;

FIG. 9, an enlarged fragmentary sectional view, part in elevation, showing the dental handpiece of FIG. 1 positioned in the tool of FIG. 5 with the tool being actuated to release the dental burr from the burr chuck of the handpiece; and FIG. 10, an enlarged side elevation of the collet forming a part of the burr chuck of the present invention.

Referring to FIGS. 1 through 4 of the drawings, a representative dental handpiece, in this case an air turbine driven dental handpiece, incorporating the improvements of the present invention is illustrated, and includes a tubular handle, generally indicated at 10, provided with a head, generally indicated at 11, at an outer end thereof. Furthermore, the particular handpiece illustrated is a contra-angle handpiece in which the axis of the head 11 is at substantially right angles to the axis of the handle 10. It should be understood, however, that the principles of the present invention are applicable to other forms of handpieces, whether contra-angle or otherwise, as well as those driven by means other than air.

The handle 10 is of usual form and encloses the usual driving air supply tube 12 and coolant supply tube 13, with the driving air supply tube being operably connected to the usual air nozzle 14 at the head 11 and the coolant supply tube being operably connected to the usual coolant nozzle 15 at the head 11. The driving air is directed against a usual air turbine in the usual manner, as will be hereinafter explained more in detail, and the exhaust driving air is preferably directed rearwardly through the handle 10 around the various supply tubes in the usual manner. The coolant nozzle 15 is arranged for directing a coolant of air or mixed air and water toward the working end of a dental burr in usual manner, as will also be hereinafter discussed more in detail.

The head 11 is generally cylindrical in configuration and forms a housing portion provided with a cylindrical bore 16 from the forward end 17 to a point spaced from the rearward end 18 thereof. At this point, the bore 16 is formed with an enlarged flange seat 19 and a threaded rearward opening 20 for the threaded reception of the head rearward end cap 21.

The head assembly includes the tubular burr chuck drive member or driving shaft 22, the rearward bearing 23, the forward bearing 24, the driving turbine 25, and the burr chuck assembly 26 which is also partially formed by the driving shaft 22. The driving shaft 22 is formed with the spaced outer cylindrical surfaces 27 separated by turbine drive formations 25 which preferably are formed integrally on the shaft circumferentially around member 22 preferably midway between spaced cylindrical surfaces 27, as shown. The radially outwardly extending flange 28 is mounted with a press fit on the forward end of shaft 22 and this flange terminates radially outwardly spaced from the head bore 16 to provide a running rotating fit for the driving shaft 22 within the head bore.

The driving shaft 22 is rotatably mounted within the head bore 16 by the bearings 23 and 24, and the particular construction of these bearings forms an important part of the principles of the present invention. As best seen in FIG. 1, the driving shaft 22 is formed with the axially spaced inner ball grooves 29 and 30 formed directly in the outer cylindrical surfaces 27 thereof, with these ball grooves extending continuously circumferentially around these cylindrical surfaces.

Further, the outer races 31 and 32 of bearings 23 and 24, respectively, are telescoped over the driving shaft outer surfaces 27, with the outer race 31 having an internal ball groove 33 radially aligned with the driving shaft ball groove 29 and the outer race 32 having an internal ball groove 34 radially outwardly aligned with the driving shaft ball groove 30. The bearing outer races 31 and 32 are positioned properly axially spaced with the usual press fit within the head bore 16, and a series of usual bearing balls 35 having the usual ball spacers 36 are positioned rotatably received within the inner ball groove 29 and outer race ball groove 33 of bearing 23 and inner ball groove 30 and outer race ball groove 34 of bearing 24, to thereby rotatably mount the driving shaft 22 within the cylindrical bore 16 of the head 11.

Thus, the inner bearing races of the bearings 23 and 24 are actually formed by the driving shaft 22 by forming the inner ball grooves 29 and 30 directly into the driving shaft outer cylindrical surfaces 27. This eliminates the necessity of providing the usual inner bearing races on the driving shaft 22 and, thereby properly rotatably mounts the driving shaft 22 within the head 11 while still providing a maximum of compactness, which is of vital importance for reducing the head of a dental handpiece to minimum size.

The usual air driven turbine 25 having the usual series of axially extending vanes 37 is positioned axially between the bearings 23 and 24, preferably formed integrally on driving shaft 22. Furthermore, the air nozzle 14 operably connected to the driving air supply tube 12 is properly aligned with the turbine 25 so that air under pressure directed from nozzle 14 will properly strike the turbine vanes 37 to rotatably drive turbine 25 and, thereby, rotatably drive the shaft 22.

The outer race 31 of the rearward bearing 23 is formed at the rearward edge thereof with a radially outwardly extending flange 38 properly formed for being received and engaged in the flange seat 19 of the head cylindrical bore 16 so that, with the cap 21 removed, the entire head assembly including the driving shaft 22 with the burr chuck assembly 26, the bearings 23 and 24, and the turbine 25, may be received through the head rearward threaded opening 20 forwardly into the head bore 16 until the flange 28 on shaft 22 is at the head forward end 17 and the flange 38 of the rearward bearing outer race 31 is received in the flange seat 19 of the head bore 16. The assembly is then completed merely by threading the rearward end cap 21 of head 11 into the rearward threaded opening 20 until this cap abuts against the flange 38 of the rearward bearing outer race 31, to thereby retain this head assembly properly positioned.

The burr chuck assembly 26, as previously stated, is formed partially by the driving shaft 22, again thereby providing maximum compactness and a minimum over-all size for the head 11. As shown in FIGS. 1 through 4, the shaft 22 is formed hollow or tubular having the axially extending generally cylindrical chuck opening 39 formed with the tapered wall portion 40 at the forward end thereof, the cylindrical wall portion 41 centrally thereof, and the threaded wall portion 42 at the rearward end thereof.

The tapered wall portion 40 tapers radially inwardly in the axial direction from the chuck opening rearward end toward the forward end and this tapered wall portion opens outwardly of the head 11. Furthermore, a cap 43 is threadably received in the threaded wall portion 42 closing the rearward end of the chuck opening 39, with this cap having an inner generally radially extending surface forming a rearward end surface 44 for the chuck opening 39.

A hollow generally cylindrical and preferably axially split collet 45 is axially slidably received in the chuck opening 39 and this collet is formed with generally axially extending and circumferentially spaced resilient gripping fingers 46 extending forwardly in the axial direction from the rearward end toward the forward end of the chuck opening 39, that is, from within the cylindrical wall portion 41 forwardly into and axially along the tapered wall portion 40. Further, the collet is preferably axially split by the slot 45a formed between two of the gripping fingers 46, as best seen in FIG. 10, and these gripping fingers are formed at the forward inner surfaces with gripping surfaces 47 generated from the axis of the collet 45 and, therefore, the axis of the chuck opening 39. Still further, these gripping fingers 46 are formed to bear resiliently radially outwardly against the tapered wall portion 40 of the chuck opening 39.

Thus, when the collet 45 is moved axially forwardly relative to the tapered wall portion 30 of the chuck opening 39, this tapered wall portion will force the resilient gripping fingers 46 to progressively smaller diameters, thereby causing the gripping surfaces 47 to move radially inwardly to progresively smaller diameters. Also, reverse axial movement of the collet 45 relative to the tapered wall portion 40 of chuck opening 39, or in the axial direction toward the rearward end of the chuck opening, will cause the gripping fingers 46 and thereby the gripping surfaces 47 to move progressively radially outwardly to larger diameters, due to the resiliency of the gripping fingers 46 and the fact that these gripping fingers bear resiliently radially outwardly against the tapered wall portion 40.

A coiled compression spring 48 is positioned preferably under constant compression axially between the rearward end of the collet 45 and the rearward end surface 44 of the chuck opening 39 formed by the cap 43, so that this compression spring 48 normally urges the collet 45 and, therefore, the gripping fingers 46 thereof, axially forwardly along the tapered wall portion 40. Finally, an axially extending burr centering recess 49 is formed centrlaly into the cap 43 in the rearward end surface 44 of the chuck opening 39, or in this surface radially inwardly from the rearward end of compression spring 48.

Thus, with the collet 45 moved sufficiently rearwardly in the chuck opening 39 to provide a sufficient opening within the gripping surfaces 47 of the gripping fingers 46, the shank 50 of a usual dental working tool, such as the burr 51, may be inserted axially into the forward open end of the chuck opening 39, through the collet 45, through the compression spring 48, and into the burr centering recess 49 in the rearward end surface 44 of the chuck opening. Thereafter, merely by releasing any axial rearward force on the collet 45, the compression spring 48 will resiliently urge the collet 45 axially forwardly and cause the collet gripping fingers 46 to move axially forwardy along the tapered wall portion 40. This, in turn, will move the gripping surfaces 47 of these gripping fingers radially inwardly to smaller diameters and cause these surfaces to finally tightly grip the forward end of the burr shank 50.

As can be seen in FIG. 1, this will position the rearward end of the burr shank 50 securely in the burr centering recess 49 of the chuck opening rearward end surface 44 and the forward end of burr shank 50 tightly gripped by the collet gripping fingers 46. In this manner, the burr shank 50 is retained perfectly centered at the rearward end thereof by the burr centering recess 49 and is retained gripped and perfectly centered at the forward end thereof by the collet gripping fingers 46.

With the burr 51 held gripped and centered by the burr chuck assembly 26, air directed from the air nozzle 14 against the driving turbine 25 will rotate the driving shaft 22, thereby rotating the burr 51. Further, with the burr 51 held in this manner by the burr chuck assembly 26, the forward cutting end surface 52 of the burr is aligned in the jet stream of coolant from the coolant nozzle 15, as shown.

For removal of the burr 51 from the handpiece, it is merely necessary to exert a rearward axial force against collet gripping fingers 46, moving the collet 45 axially rearwardly relative to the tapered wall portion 40 of chuck opening 39, as permitted by compression of the compression spring 48, which in turn causes the collet gripping fingers 46 to move axially and assume progressively larger diameters, and, thereby, ultimately release the shank 50 of burr 51. At this time, the burr 51 can be easily removed and replaced by any other desired working tool.

Further according to the principles of the present invention, a burr chuck releasing tool is shown in FIG. 5 through 9, which tool is specifically adapted for convenient release of the unique burr chuck described in the foregoing. This releasing tool includes a hollow, generally cylindrical frame 53 provided with an open rearward end 54, an intermediate radial cut-out 55, and a generally radially extending forward end 56.

An axially reciprocal cylindrical plunger 57 is received in the open rearward end 54 of frame 53, with this plunger being reciprocally mounted extending into the frame by the guide screw 58 mounted in and extending radially from the plunger 57 and slidably received in the axially extending guide slot 59 of frame 53. Furthermore, plunger 57 is mounted axially reciprocal in the frame 53 such that the generally radially extending forward end surface 60 of plunger 57 may be selectively moved axially into the radial cut-out 55 of frame 53.

The forward end 56 of frame 53 is formed with an axially extending opening 61 extending therethrough for receiving the collar 62 having the axially extending bore 63. Further, a rearwardly extending flange 64 is formed projecting from the generally radially extending rearward surface 65 of collar 62 and a radially extending burr access slot 66 is formed through the frame forward end 56 and collar 62 including the flange 64 opening into the bore 63, as best seen in FIGS. 5, 7 and 8.

Thus, when a burr 51 is positioned in the burr chuck assembly 26 as previously described and shown in FIGS.

1 through 4, and it is desired to remove this burr, the plunger 57 of the releasing tool is moved axially rearwardly away from the frame forward end 56 and the head 11 of the dental handpiece is inserted radially into the frame 53 through the radial cut-out 55 beneath the plunger forward end surface 60. During this radial insertion of the head 11, the head is positioned with the burr 51 extending axially forwardly of the frame 53 and with this burr being received radially through the burr access slot 66 into the bore 63 of the collar 62 on the frame forward end 56.

Once the dental handpiece head 11 is positioned in the frame 53, it is merely necessary to move the plunger 57 axially forwardly so that the forward end surface 60 of this plunger engages the rearward end 18 of the dental handpiece 11 or the head cap 21. Thereafter, further forward axial movement of the plunger 57 will force the flange 64 of collar 62 on the frame forward end 56 axially against the forward ends of the collet gripping fingers 46 in burr chuck assembly 26 and into the chuck opening 39 of driving shaft 22.

As shown in FIG. 9, this will begin relative axial movement between the flange 64 of collar 62 on the frame forward end 56 and the dental handpiece head 11, causin collar 62 to move the collet 45 axially rearwardly and thereby release the shank 50 of burr 51, as previously described. This, in turn, will permit the burr 51 to drop or be pulled axially forwardly through the bore 63 of collar 62 on the frame forward end 56 and ultimately to move axially completely free of the dental handpiece head 11.

Insertion of another dental working tool may then be accomplished while the burr chuck assembly 26 is retained in this released condition. Thereafter, the plunger 57 is released permitting the burr chuck assembly 26 to grip the shank of the new tool and the dental handpiece head 11 is moved radially out of frame 53.

Thus, according to the principles of the present invention, by providing the bearings 23 and 24 formed partially by the driving shaft 22, and the burr chuck assembly 26 partially by the driving shaft 22, a dental handpiece head 11 is provided of minimum size, yet the driving shaft 22 is properly and efficiently rotatably mounted in the head 11 and a burr chuck assembly 26 is provided for securely retaining and rotating a usual dental working tool, such as the burr 51. Furthermore, by use of a simple unique burr chuck assembly 26, this burr chuck may be easily and conveniently virtually totally released for quickly removing and replacing the particular dental working tools. Also unique burr centering means is provided in the burr chuck assembly 26 for retaining the burr 51 or other dental working tools in the head 11 properly and perfectly centered for high speed rotation.

In the foregoing description, certain terms have been used for brevity, clearness and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of the preferred embodiment thereof, and the advantageous new and useful results obtained thereby, the new and useful construction and reasonable mechanical equivalents thereof obvious to those skilled in the art are set forth in the appended claims.

I claim:

1. In a dental handpiece of the type having a handle and a head at an outer end of the handle; the head including a housing, a burr chuck, bearing means for rotatably mounting the chuck in the housing, drive means operably connected to the chuck for selectively rotating the chuck, the chuck having an axially extending opening formed therein with a rearward end and a forward end opening outwardly of an end of the housing, the chuck opening having a radially inwardly tapered wall portion tapering radially inwardly in the axial direction from the opening rearward end toward the forward end, a hollow generally cylindrical collet axially slidably received in the chuck opening and having resilient gripping fingers extending in an axial direction toward the opening forward end received in the opening tapered wall portion and bearing resiliently against said wall portion; an end cap removably mounted on the burr chuck at the chuck opening rearward end forming a chuck rearward end surface; a compression spring within the chuck opening rearwardly engaging the chuck cap rearward end surface and operably connected to the collet axially rearwardly of the collet gripping fingers for normally resiliently urging the collet gripping fingers axially forwardly along said opening tapered wall portion to resiliently grip a dental burr, and compressible for inward axial movement of said collet gripping fingers along said opening tapered wall portion to release said burr; and a centering recess formed in the chuck cap rearward end surface for receiving an end of the dental burr and supporting said burr between said recess and the collet gripping fingers.

2. In a dental handpiece of the type having a handle and a head at an outer end of the handle; the head including a housing, a burr chuck having a cylindrical outer surface, axially spaced ball grooves formed directly in and extending continuously circumferentially around the chuck cylindrical outer surface, outer ball bearing races positioned telescoped over the chuck radially outwardly of the ball grooves in the chuck cylindrical outer surface, said outer races having internal ball grooves formed therein radially outwardly aligned with the chuck ball grooves, a series of balls positioned between the outer races and chuck cylindrical outer surface received in the chuck and outer race ball grooves, means securing the outer races in the housing for rotatably mounting the chuck in the housing, drive means operably connected to the chuck for rotating said chuck, the chuck having an axially extending opening formed therein with a rearward end and a forward end opening outwardly of an end of the housing, the chuck opening having a radially inwardly tapered wall portion tapering radially inwardly in the axial direction from the opening rearward end toward the forward end, a hollow generally cylindrical collet axially slidably received in the chuck opening and having resilient gripping fingers extending in an axial direction toward the opening forward end received in the opening tapered wall portion and bearing resiliently against said wall portion; an end cap removably mounted on the burr chuck at the chuck opening rearward end forming a chuck rearward end surface; a compression spring within the chuck opening rearwardly engaging the chuck cap rearward end surface and operably connected to the collet axially rearwardly of the collet gripping fingers for normally resiliently urging the collet gripping fingers axially forwardly along said opening tapered wall portion to resiliently grip a dental burr, and compressible for inward axial movement of said collet gripping fingers along said opening tapered wall portion to release said burr; and a centering recess formed in the chuck cap rearward end surface for receiving an end of the dental burr and supporting said burr between said recess and the collet gripping fingers.

3. In a dental handpiece of the type having a handle and a head at an outer end of the handle, the head including a housing; a tubular burr chuck drive member having a forward end and a rearward end and being formed with spaced cylindrical outer surfaces respectively adjacent said forward and rearward ends, drive formations formed integrally on and extending circumferentially around the drive member midway between said spaced cylindrical outer surfaces, forward and rearward bearing means mounted in the housing operably connected respectively with said forward and rearward drive member cylindrical surfaces rotatably mounting the drive member in the housing; the forward end of the tubular drive member being formed internally adjacent the forward cylindrical surface with a tapered wall portion tapering inwardly in the axial direction from the drive member rearward end toward the forward end; end cap means removably mounted adjacent the rearward cylindrical surface in said tubular drive member rearward end having an end surface formed with a central recess spaced from said tapered wall portion; the drive member having a central cylindrical internal surface extending between the tapered wall portion and said cap end surface; a hollow generally cylindrical collet having axially extending gripping fingers mounted within the internally tapered drive member wall portion; a compression spring located within the tubular drive member and extending along said central cylindrical surface between the collet and said cap end surface normally resiliently urging the collet gripping fingers toward the forward end of the drive member to resiliently grip a dental burr shank extending through said collet and spring, and compressible for rearward movement of the collet to release said burr shank; and the centering recess receiving an end of the burr shank and supporting said shank at the recess adjacent the rearward bearing means when said burr shank is gripped by said collet gripping fingers adjacent the forward bearing means.

References Cited by the Examiner
UNITED STATES PATENTS

| | | | |
|---|---|---|---|
| 2,360,832 | 10/1944 | Fosdal | 32—27 |
| 2,478,382 | 8/1949 | Fischer | 81—128 |
| 2,879,594 | 3/1959 | Massen | 32—26 |
| 3,074,167 | 1/1963 | Turchi et al. | 32—27 |

ROBERT E. MORGAN, *Acting Primary Examiner.*